United States Patent
Nisimura et al.

(10) Patent No.: US 9,227,727 B2
(45) Date of Patent: Jan. 5, 2016

(54) LIGHTING SYSTEM

(71) Applicant: PANASONIC CORPORATION, Osaka (JP)

(72) Inventors: Tadasi Nisimura, Kyoto (JP); Youji Tachino, Nara (JP); Atsushi Motoya, Shiga (JP); Takashi Ohta, Osaka (JP); Hiroshi Kido, Osaka (JP); Junichi Hasegawa, Osaka (JP); Shigeo Gotoh, Osaka (JP); Nobuyuki Matsui, Osaka (JP); Tadashi Murakami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/250,908

(22) Filed: Apr. 11, 2014

(65) Prior Publication Data

US 2014/0307454 A1    Oct. 16, 2014

(30) Foreign Application Priority Data

Apr. 12, 2013   (JP) ................................. 2013-084264

(51) Int. Cl.
*B64D 47/02*     (2006.01)
*B64D 11/00*     (2006.01)

(52) U.S. Cl.
CPC ........ *B64D 11/00* (2013.01); *B64D 2011/0038* (2013.01); *B64D 2203/00* (2013.01); *Y02T 50/46* (2013.01)

(58) Field of Classification Search
CPC ........... B64D 2011/0038; B64D 47/04; B64D 2203/00; B64D 11/00; F21K 9/50
USPC ................. 362/147, 470, 471, 479, 488, 490
See application file for complete search history.

(56) References Cited

U.S. PATENT DOCUMENTS 2,595,858 A * 5/1952 Kuhler .......................... 362/484
5,129,597 A * 7/1992 Manthey et al. .............. 362/471
7,204,622 B2 4/2007 Dowling et al.
(Continued)

FOREIGN PATENT DOCUMENTS

| JP | 2005-537613 | 12/2005 |
| JP | 2010-231941 | 10/2010 |
| WO | 2004/021747 | 3/2004 |

OTHER PUBLICATIONS

U.S. Appl. No. 14/250,900 to Youji Tachino et al., filed Apr. 11, 2014.
(Continued)

*Primary Examiner* — Y M Lee
(74) *Attorney, Agent, or Firm* — Greenblum & Bernstein, P.L.C.

(57) ABSTRACT

A lighting system includes a lighting apparatus provided along one side of an aisle and a specular reflection plate provided along the other side of the aisle to reflect the light emitted from the lighting apparatus toward a region where the lighting apparatus is provided. According to the above configuration, the lighting apparatus can illuminate the region where the lighting apparatus is provided. Therefore, it is possible to effectively illuminate a cabin of an aircraft with less lighting apparatuses as compared to conventional lighting apparatuses which are provided along both sides of the aisle. Moreover, since the number of the lighting apparatuses can be reduced, it is possible to improve fuel efficiency of the aircraft by reducing the total weight of the aircraft.

7 Claims, 3 Drawing Sheets

(56) References Cited

U.S. PATENT DOCUMENTS

| | | | |
|---|---|---|---|
| 9,169,017 B2* | 10/2015 | Palagashvili | B64D 11/00 |
| 2004/0090787 A1 | 5/2004 | Dowling et al. | |
| 2007/0109802 A1* | 5/2007 | Bryan et al. | 362/545 |
| 2007/0153514 A1 | 7/2007 | Dowling et al. | |

OTHER PUBLICATIONS

U.S. Appl. No. 14/250,888 to Takashi Ohta et al., filed Apr. 11, 2014.
U.S. Appl. No. 14/250,882 to Takashi Ohta et al., filed Apr. 11, 2014.

* cited by examiner

LONGITUDINAL DIRECTION

TRANSVERSE DIRECTION

TRANSVERSE DIRECTION

TO WINDOW-SIDE STORAGE BIN 2a (2b)

AISLE P SIDE

LIGHTING SYSTEM

FIELD OF THE INVENTION

The present invention relates to a lighting system that illuminates a ceiling in a cabin of an aircraft.

BACKGROUND

Examples of lighting apparatuses provided in a cabin of an aircraft include: lighting apparatuses provided at a floor surface of an aisle at prescribed intervals; lighting apparatuses that locally illuminate passenger seats for reading or the like; and lighting apparatuses that illuminate a ceiling above the aisle. Among these lighting apparatuses, the brightness in the cabin is mainly controlled by the lighting apparatuses that illuminate the ceiling above the aisle.

In recent years, for improvement of fuel efficiency of aircraft, not only the body of the aircraft but also various apparatuses installed in the cabin of the aircraft are required to be reduced in weight. For this purpose, a lighting apparatus for use in the cabin of an aircraft, which adopts LEDs as light sources, has been known (refer to Japanese Unexamined Patent Application Publication No. 2005-537613, for example). In particular, many lighting apparatuses for illuminating the ceiling above the aisle are provided over the entire length of the cabin, and therefore, using compact and light-weight LEDs as light sources of each lighting apparatus contributes to a reduction in the total weight of the aircraft.

FIG. 5 is a diagram showing an example of lighting systems using this kind of the lighting apparatuses. In FIG. 5, a lighting system 10 is used for illuminating a ceiling C above an aisle P in a cabin of an aircraft AP, and has lighting apparatuses 20 and 30 provided in two rows above and along one side and the other side of the aisle P, respectively. The lighting apparatuses 20 and 30 are mounted to upper ends of overhead storage bins 40 and 50 above a seat S, respectively, so as to be hidden from passengers sitting in the seat S. Light outputted from the lighting apparatuses 20 and 30 (indicated by arrowed broken lines) is emitted to the ceiling C and also to an upper part of the storage bins 40 and 50.

SUMMARY

Problems to be Solved by the Invention

However, since the two lighting apparatuses 20 and 30 are provided for one aisle P, the lighting system 10 becomes heavy and thus the total weight of the aircraft AP increases, resulting in poor fuel efficiency of the aircraft AP. On the other hand, if the only one lighting apparatus is mounted for one aisle P, the storage bin where the lighting apparatus is mounted cannot be illuminated.

The present invention has been made to solve the above problems, and an object of the present invention is to provide a lighting system that can effectively illuminate a cabin of an aircraft with less lighting apparatuses and can contribute to an improvement of fuel efficiency of the aircraft by reducing the total weight of the aircraft.

Solution to the Problems

One aspect of the present invention relates to a lighting system that illuminates a ceiling in a cabin of an aircraft having an aisle extending along a traveling direction of the aircraft, wherein a lighting apparatus is provided along one side of the aisle to emit light in a direction orthogonal to the aisle, and a specular reflection plate is provided along the other side of the aisle to reflect the light emitted from the lighting apparatus toward a region where the lighting apparatus is provided.

According to another aspect of the invention, an optical axis of the light emitted from the lighting apparatus does not coincide with an optical axis of the light reflected by the specular reflection plate.

According to further aspect of the invention, two or more aisles are provided, the lighting apparatus is mounted to an upper end of a window-side storage bin, which is provided above a window-side seat of the aircraft, on the aisle side and emits the light upward relative to a horizontal direction, and the specular reflection plate is mounted to an upper end of an inter-aisle storage bin, which is provided above an inter-aisle seat between the aisles, on the aisle side and reflects the light downward relative to the horizontal direction.

According to further aspect of the invention, the lighting device has an LED and a lens for collecting and emitting the light emitted from the LED, so that the light is emitted by the lighting device toward a lateral surface of the inter-aisle storage bin on the aisle side by adjusting an optical axis of the LED or an optical axis of the lens, and the light is reflected by the specular reflection plate toward a lateral surface of the window-side storage bin on the aisle side by adjusting a mounting angle of the specular reflection plate.

According to further aspect of the invention, in the cross section in the direction orthogonal to the direction in which the aisles extend, the lighting apparatus on one side is located below a first line connecting a viewpoint of a passenger sitting on the window-side seat on the other side and a tip of a protrusion provided on the upper end of the window-side storage bin on the aisle side, and the specular reflection plate is located below a second line connecting the viewpoint and a tip of a protrusion provided on an upper end of the inter-aisle storage bin on the other side.

According to further aspect of the invention, an angle made by the first line and a horizontal line is 15° or less, and an angle made by the second line and the horizontal line is 40° or less.

Effects of the Invention

According to an embodiment of the present invention, the light emitted from the lighting apparatus provided along one side of the aisle is reflected by the specular reflection plate provided along the other side of the aisle and then irradiated toward a region where the lighting apparatus is provided. Therefore, the lighting apparatus can illuminate the region where the lighting apparatus is provided. Accordingly, it is possible to effectively illuminate the cabin with less lighting apparatuses as compared to conventional lighting apparatuses which are provided along both sides of the aisle. Moreover, since the number of the lighting apparatuses can be reduced, it is possible to improve fuel efficiency of the aircraft by reducing the total weight of the aircraft.

DETAILED DESCRIPTION

Figure 1:
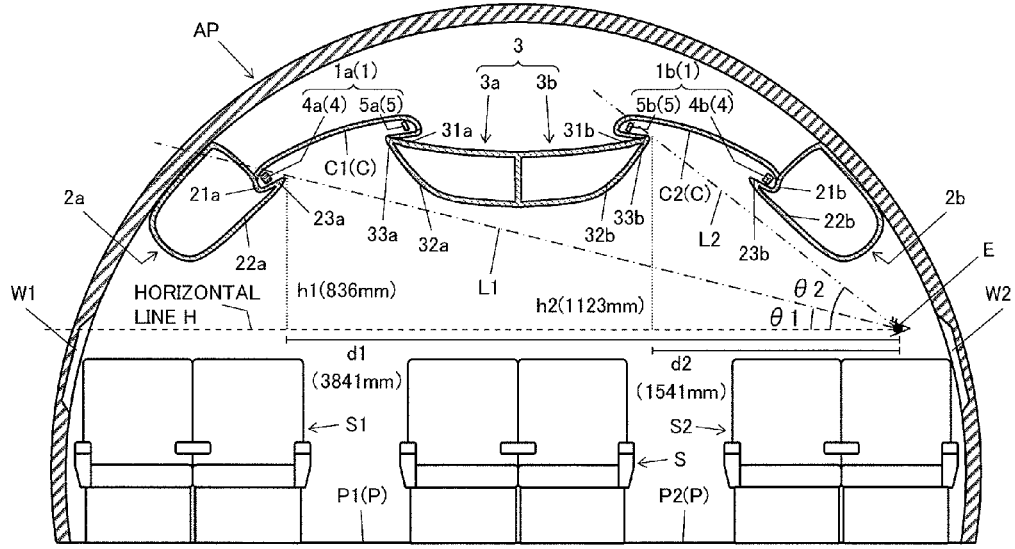
FIG. 1 is a cross sectional view of an aircraft in which a lighting system according to an embodiment of the present invention is installed.

A lighting system according to an embodiment of the present invention will be described with reference to FIGS. 1 to 4. FIG. 1 shows a cross sectional view of an aircraft AP in a direction orthogonal to an aisle P extending along a traveling direction of the aircraft AP.

A lighting system 1 illuminates a ceiling C above the aisle P. In FIG. 1, for example, aisles P1 and P2 are provided in two rows, and a ceiling C1 is located above the aisle P1 and a ceiling C2 is located above the aisle P2. A window-side seat S1 is placed between the aisle P1 and one side window W1, a window-side seat S2 is placed between the aisle P2 and other side window W2, and an inter-aisle seat S is placed between the aisles P1 and P2. Moreover, a window-side storage bin 2a is placed above the window-side seat S1, a window-side storage bin 2b is placed above the window-side seat S2, and an inter-aisle storage bin 3 is placed above the inter-aisle seat S. The inter-aisle storage bin 3 has an inter-aisle storage bin 3a provided at the aisle P1 side and an inter-aisle storage bin 3b provided at the aisle P2 side.

The lighting system 1 includes a lighting apparatus 4 provided along one side of the aisle P to emit light in a direction orthogonal to the aisle P and a specular reflection plate 5 provided along the other side of the aisle P to reflect the light emitted from the lighting apparatus 4 toward a region where the lighting apparatus 4 is provided. A lighting system 1a is provided for the aisle P1 and a lighting system 1b is provided for the aisle P2. The lighting system 1a is mainly described below, however, the lighting system 1b has a constitution similar to that of the lighting system 1a.

In the lighting system 1a, a lighting apparatus 4a is provided along the window-side seat S1 side of the aisle P1, and a specular reflection plate 5a is provided along the inter-aisle seat S side of the aisle P1. The lighting apparatus 4a is mounted to an upper end 21a of the window-side storage bin 2a on the aisle P1 side. The specular reflection plate 5a is mounted to an upper end 31a of the inter-aisle storage bin 3a on the aisle P1 side.

An optical axis of the light emitted from the lighting apparatus 4a does not coincide with an optical axis of the light reflected by the specular reflection plate 5a. In particular, the lighting apparatus 4a emits the light upward relative to a horizontal direction to illuminate the ceiling C1 and a lateral surface 32a of the inter-aisle storage bin 3a on the aisle P1 side. On the other hand, the specular reflection plate 5a reflects the light downward relative to the horizontal direction to reflect the light toward a lateral surface 22a of the window-side storage bin 2a on the aisle P1 side. The optical axis of the light emitted from the lighting apparatus 4a is adjusted by adjusting a mounting angle of the lighting apparatus 4a against the window-side storage bin 2a or controlling the optical axis of LEDs or lens (refer to the following) of the lighting apparatus 4a. The optical axis of the light reflected by the specular reflection plate 5a is adjusted by adjusting a mounting angle of the specular reflection plate 5a against the inter-aisle storage bin 3a.

In the cross section of the aircraft AP in the direction orthogonal to the direction in which the aisles P1 and P2 extend, the lighting apparatus 4a is located below a first line L1 connecting a viewpoint E of a passenger sitting on the window-side seat S2 and a tip of a protrusion 23a provided on the upper end 21a of the window-side storage bin 2a. In FIG. 1, the protrusion 23a is located so that a horizontal distance d1 from the viewpoint E to the tip of the protrusion 23a is 3841 mm and a vertical distance h1 from the viewpoint E to the tip of the protrusion 23a is 836 mm. In this case, an angle θ1 made by the first line L1 and a horizontal line H is calculated to be 12° according to $\tan^{-1}$ (h1/d1).

Since the lighting apparatus 4a is located below the first line L1 so that the angle θ1 is set to approximately 15° or less as described above, the lighting apparatus 4a is hidden by the protrusion 23a and thus is not seen from a passenger sitting on the window-side seat S2. Accordingly, the light emitted from the lighting apparatus 4a is not directly irradiated to the eyes of the passenger sitting on the window-side seat S2, so that a glare can be prevented and an appearance of the ceiling C1 can be improved. In the same manner as the lighting apparatus 4a, the lighting apparatus 4b is hidden by the protrusion 23b and thus is not seen from the passenger sitting on the window-side seat S1.

On the other hand, a specular reflection plate 5b is located below a second line L2 connecting the viewpoint E and a tip of a protrusion 33b provided on an upper end 31b of the inter-aisle storage bin 3b. The protrusion 33b is, for example, located so that a horizontal distance d2 from the viewpoint E to the tip of the protrusion 33b is 1541 mm and a vertical distance h2 from the viewpoint E to the tip of the protrusion 33b is 1123 mm. In this case, an angle θ2 made by the second line L2 and the horizontal line H is calculated to be 36° according to $\tan^{-1}$ (h2/d2).

Since the specular reflection plate 5b is located below the second line L2 so that the angle θ2 is set to approximately 40° or less as described above, the specular reflection plate 5b is hidden by the protrusion 33b and thus is not seen from a passenger sitting on the window-side seat S2. Accordingly, the light reflected by the specular reflection plate 5b is not directly irradiated to the eyes of the passenger sitting on the window-side seat S2, so that the glare can be prevented and an appearance of the ceiling C2 can be improved. In the same manner as the specular reflection plate 5b, the specular reflection plate 5a is hidden by the protrusion 33a and thus is not seen by the passenger sitting on the window-side seat S1.

Figure 2:
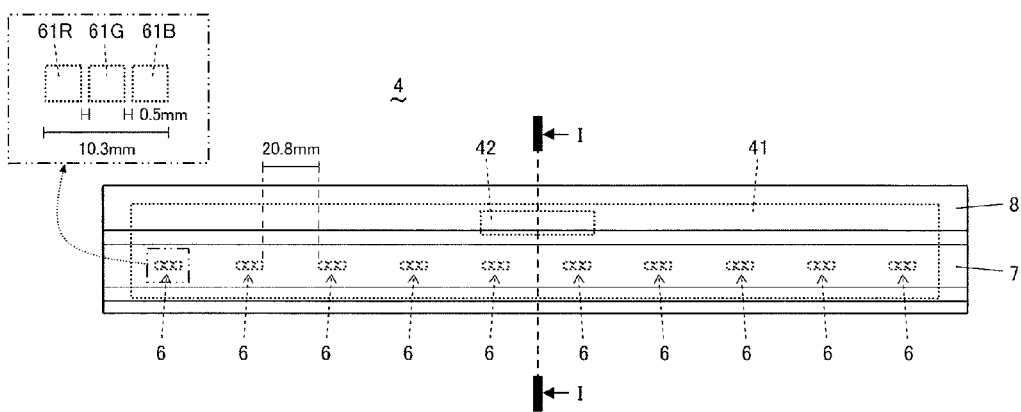
FIG. 2 is a top view of a lighting apparatus as a component of the lighting system in FIG. 1.
Figure 3:
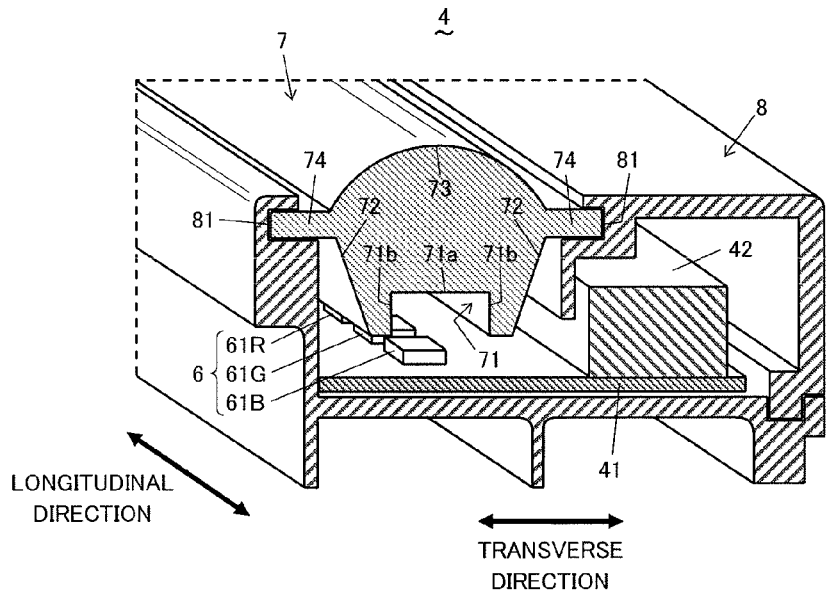
FIG. 3 is a perspective view including a cross section taken along a line I-I in FIG. 2.

As shown in FIGS. 2 and 3, the lighting apparatus 4 has an elongated shape, and includes a plurality of LED units 6 arranged linearly. In FIG. 2, for example, ten LED units 6 are arranged at intervals of 20.8 mm. Each LED unit 6 includes three LEDs 61, that is, a red LED 61R emitting red light, a green LED 61G emitting green light, and a blue LED 61B emitting blue light. The red LED 61R, the green LED 61G, and the blue LED 61B are arranged at intervals of 0.5 mm such that the length of the LED unit 61 is 10.3 mm in the direction along which the LEDs 61 are arranged. Since the LED units 6 and the LEDs 61 are arranged as described above, efficient mixing of light is achieved between the LED units 6 as well as among the LEDs 61 in each LED unit 6.

Moreover, the lighting apparatus 4 includes: a wiring board 41 on which the LED units 6 are mounted; a drive circuit 42, mounted on the wiring board 41, for driving the LED units 6; a lens 7 for collecting and emitting the light emitted from the LED units 6; and a frame 8 that holds the above components 6, 41, 42, and 7. The drive circuit 42 includes drivers (not shown) for individually modulating the light emitted from the red LED 61R, the green LED 61G, and the blue LED 61B.

The lens 7 has an elongated shape that covers all the ten LED units 6, and has a recess 71 at its surface facing to the LED units 6 (refer to FIG. 3). The recess 71 has a bottom surface serving as a first light incident surface 71a where light emitted from each LED unit 6 to the forward direction enters, and has side surfaces serving as second light incident surfaces 71b where light emitted laterally from each LED unit 6 enters. In addition, the lens 7 has total reflection surfaces 72 that are provided so as to face the second light incident surfaces 71b and totally reflect the light that enters from the second light incident surfaces 71b, and a light emitting surface 73 that emits the light that is totally reflected by the total reflection surfaces 72 and the light that enters from the first light incident surface 71a. The light emitting surface 73 has a convex shape and collects the light to emit. Moreover, the lens 7 has a pair of flange portions 74 extending outward from both ends of the lens 7 in the transverse direction. The pair of flange portions 74 is inserted into a pair of grooves 81 provided on the frame 8 along the longitudinal direction of the frame 8 to detachably mount the lens 7 to the frame 8.

Figure 4A:
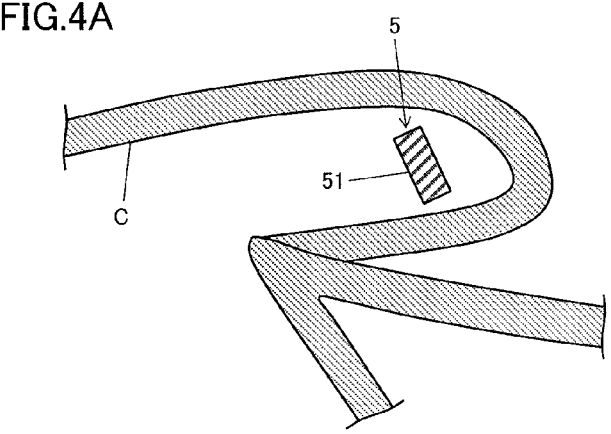
FIG. 4A and FIG. 4B are cross sectional views of a specular reflection plate as a component of the lighting system in FIG. 1.
Figure 4B:
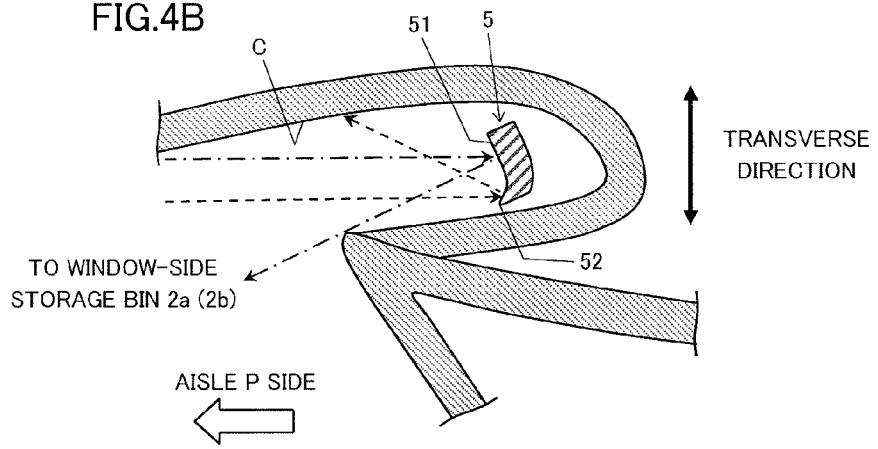
Figure 5:
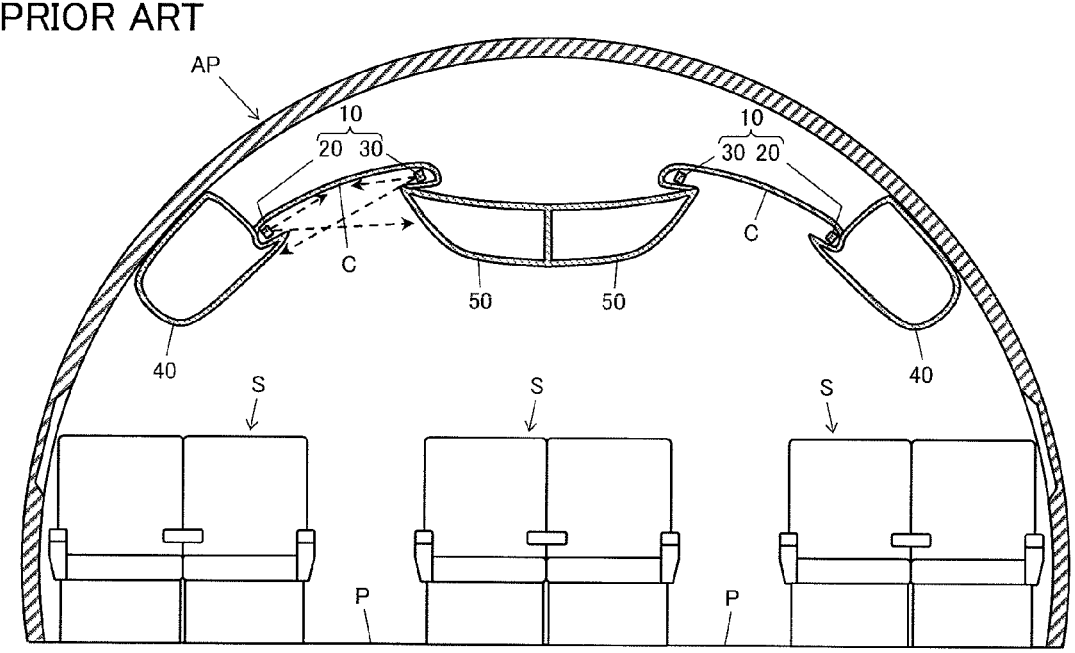
FIG. 5 is a cross sectional view of an aircraft in which a conventional lighting system is installed.

The specular reflection plate 5 is formed, for example, by depositing a metal material such as silver, aluminum, or the like, on a lightweight plastic plate and is made lighter in weight than the lighting apparatus 4. The specular reflection plate 5 has an elongated shape corresponding to a shape of the lighting apparatus 4. As shown in FIG. 4A, a light reflection surface 51 of the specular reflection plate 5 may have a planar shape. In addition, as shown in FIG. 4B, the light reflection surface 51 may have a curved shape in which an end portion 52, farther from the ceiling C in the transverse direction of the specular reflection plate 5, curves toward the aisle P. When the specular reflection plate 5 has such a curved shape, the light can be reflected toward the window-side storage bin 2a (2b) (the optical path is shown by arrowed chain line) and also toward the ceiling C efficiently (the optical path is shown by arrowed broken line).

According to the lighting system 1 of the present embodiment, the light emitted from the lighting apparatus 4 provided along one side of the aisle P is reflected by the specular reflection plate 5 provided along the other side of the aisle P and then irradiated toward the region of the lighting apparatus 4 is provided. Therefore, the lighting apparatus 4 can illuminate the region where the lighting apparatus 4 is provided. Accordingly, it is possible to effectively illuminate the cabin with less lighting apparatuses 4 as compared to conventional lighting apparatuses which are provided along both sides of the aisle P. Moreover, since the number of the lighting apparatuses 4 can be reduced and the specular reflection plate 5 is made lighter in weight than the lighting apparatus 4, it is possible to improve fuel efficiency of the aircraft by reducing the total weight of the aircraft.

The lighting system according to the present invention is not limited to the above embodiment and may be modified in various manners. For example, the lighting apparatus may include an organic electroluminescence element or a fluorescent light as a light source. Moreover, the present lighting system may also be provided along each aisle of an aircraft having three or more aisles.

The invention claimed is:

1. A lighting system that illuminates a ceiling in a cabin of an aircraft having an aisle extending along a traveling direction of the aircraft, wherein
a lighting apparatus is provided along one side of the aisle to emit light in a direction orthogonal to the aisle,
a specular reflection plate is provided along the other side of the aisle to reflect the light emitted from the lighting apparatus toward a region where the lighting apparatus is provided, and
the lighting apparatus has an LED as a light source.

2. The lighting system according to claim 1, wherein
an optical axis of the light emitted from the lighting apparatus does not coincide with an optical axis of the light reflected by the specular reflection plate.

3. The lighting system according to claim 2, wherein
two or more aisles are provided,
the lighting apparatus is mounted to an upper end of a window-side storage bin, which is provided above a window-side seat of the aircraft, on the aisle side and emits the light upward relative to a horizontal direction, and
the specular reflection plate is mounted to an upper end of an inter-aisle storage bin, which is provided above an inter-aisle seat between the aisles, on the aisle side and reflects the light downward relative to the horizontal direction.

4. The lighting system according to claim 3, wherein
the lighting apparatus has a lens for collecting and emitting the light emitted from the LED, so that the light is emitted by the lighting apparatus toward a lateral surface of the inter-aisle storage bin on the aisle side by adjusting an optical axis of the LED or an optical axis of the lens, and
the light is reflected by the specular reflection plate toward a lateral surface of the window-side storage bin on the aisle side by adjusting a mounting angle of the specular reflection plate.

5. The lighting apparatus according to claim 3, wherein
in the cross section in the direction orthogonal to the direction in which the aisles extend,
the lighting apparatus on one side is located below a first line connecting a viewpoint of a passenger sitting on the window-side seat on the other side and a tip of a protrusion provided on the upper end of the window-side storage bin on the aisle side, and
the specular reflection plate is located below a second line connecting the viewpoint and a tip of a protrusion provided on an upper end of the inter-aisle storage bin on the other side.

6. The lighting system according to claim 5, wherein
an angle made by the first line and a horizontal line is 15° or less, and an angle made by the second line and the horizontal line is 40° or less.

7. The lighting apparatus according to claim 4, wherein
in the cross section in the direction orthogonal to the direction in which the aisles extend,
the lighting apparatus on one side is located below a first line connecting a viewpoint of a passenger sitting on the window-side seat on the other side and a tip of a protrusion provided on the upper end of the window-side storage bin on the aisle side, and
the specular reflection plate is located below a second line connecting the viewpoint and a tip of a protrusion provided on an upper end of the inter-aisle storage bin on the other side.

* * * * *